United States Patent [19]
Yamaguchi et al.

[11] Patent Number: 6,070,931
[45] Date of Patent: Jun. 6, 2000

[54] ASSEMBLY STRUCTURE OF AN AUTOMOTIVE DOOR HARNESS

[75] Inventors: Noboru Yamaguchi; Yasuyoshi Serizawa, both of Shizuoka, Japan

[73] Assignee: Yazaki Corporation, Tokyo, Japan

[21] Appl. No.: 08/887,284

[22] Filed: Jul. 2, 1997

[30] Foreign Application Priority Data

Jul. 5, 1996 [JP] Japan .................................. 8-176688

[51] Int. Cl.$^7$ ...................................................... B60J 5/04
[52] U.S. Cl. ........................................................ 296/146.7
[58] Field of Search ............................... 296/152, 146.7, 296/146.12

[56] References Cited

U.S. PATENT DOCUMENTS

| 4,653,799 | 3/1987 | Arai et al. | 296/146.12 |
| 4,862,011 | 8/1989 | Wright | 296/152 |
| 5,716,044 | 2/1998 | Peterson et al. | 296/152 |

FOREIGN PATENT DOCUMENTS

| 58-113566 | 8/1983 | Japan . |
| 8-33166 | 2/1996 | Japan . |

*Primary Examiner*—Gary C. Hoge
*Attorney, Agent, or Firm*—Armstrong, Westerman, Hattori, McLeland & Naughton

[57] ABSTRACT

Between the door panel and the door trim is installed a protector, through which a wiring harness is inserted. The wiring harness has a connector arranged at one end of the protector. The protector is slidably held along a slide guide on a door trim mounted on a car door. The slide guide for the protector has a base plate portion having a guide slot and legs for fixing the slide guide to the door trim. The protector is situated on the back side of the base plate portion along the legs and is retracted into the protector receiving portion through the cut hole in the door trim. The slide guide is provided with a temporary locking portion to temporarily hold the protector when the door is in a subassembly state.

9 Claims, 5 Drawing Sheets

ASSEMBLY STRUCTURE OF AN AUTOMOTIVE DOOR HARNESS

BACKGROUND OF THE INVENTION

1. Field of the Invention

The present invention relates to an assembly structure of an automotive door harness that can be assembled onto the automotive door with high efficiency and can reliably waterproof the door without using a grommet.

2. Description of the Related Art

FIG. 7 shows an assembly structure of an automotive door harness described in Japanese Patent Application Laid-Open Specification No. Heisei 8-33166.

This structure has a recessed groove 73 at a front end face 72 of a door panel 71 on the hinge mounting side extending in a direction of door thickness. In this recessed groove 73 is laid a wiring harness 74, over which is slid and fitted a base plate portion 76 of a rubber grommet 75, with a front end portion 74a of the wiring harness inserted through a bellows portion 77 of the grommet 75 so that the wiring harness can be led toward the car body side.

The above structure, however, requires troublesome processes of inserting the wiring harness 74 through a hole 78 of the grommet 75 and putting the front end of the bellows portion 77 in place on the car body side.

FIG. 8 and 9 show an assembly structure of the automotive door harness described in Japanese Patent Application Laid-Open Specification No. Showa 58-113566.

In this structure, both a door panel 81 and a car body 82 are formed with piercing holes 83, 84, through which is passed a cylindrical elastic protector 85 made of rubber having a wiring harness 86 inserted therethrough, with one end of the elastic protector 85 secured to the car body with a clamp 87 and the other end extending unfixed along the door panel 81. A core material 88 is inserted in a part of the protector 85 on the door side to give it a certain rigidity so that when a door 90 is opened about a hinge 89 as shown in FIG. 9, the protector 85 slides in the piercing hole 83 and bends at an intermediate portion to follow the movement of the door 90.

This structure, however, requires a cumbersome assembly work of inserting the protector 85 through the piercing holes 83, 84 with the door 90 open. This installation of the wiring harness 86 is not easy particularly because the protector 85 on the door side does not bend.

SUMMARY OF THE INVENTION

Under these circumstances, it is an object of the present invention to provide an assembly structure of automotive door harness that improves the work efficiency of assembling wiring harnesses into automotive doors.

In order to attain the object, according to an aspect of this invention, there is provided an assembly structure of an automotive door harness comprising: a car door including a door inner panel and a door trim which covers the door inner panel; a protector installed between the door inner panel and the door trim; and a wiring harness inserted through the protector and having a connector attached at one end of the protector; wherein the protector is slidably held on the door trim.

Preferably, a slide guide is provided on the door trim to slidably hold the other end of the protector.

Preferably, the assembly structure further comprises a protector receiver provided adjacent to a car body-side end of the slide guide for receiving the protector therein when the protector is retracted on closing the door.

Preferably, the protector receiver is provided at a first side of the door trim where the slide guide is provided.

Preferably, the protector receiver is provided at a second side of the door trim opposite the first side, wherein the slide guide comprises a plate portion formed with a longitudinally extending guide slot and leg portions extending perpendicularly from the plate portion and secured to the door trim, and wherein the protector is situated between the plate portion and the door trim, projects to the second side through a cut hole in the door trim, and is retracted into the protector receiver on closing the door.

Preferably, the leg portions comprise two pairs of leg portions provided at longitudinally opposite ends of the plate portion.

Preferably, a projection is provided at the other end of the protector which slidably engages in the guide slot of the plate portion.

Preferably, the protector receiver has a tapered wall gradually diverging as it nears a car body-side end of the door trim.

According to another aspect of this invention, there is provided an assembly structure of an automotive door harness comprising: a car door including a door inner panel and a door trim which covers the door inner panel; a protector installed between the door inner panel and the door trim; a wiring harness inserted through the protector and having a connector attached at one end of the protector; and a slide guide provided on the door inner panel or on the door trim, which slidably holds the other end of the protector, wherein the slide guide is provided with a temporary locking means to temporarily lock the protector such that the protector will not be dislocated or protrude outside when the door is in a subassembly state.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENTS

An embodiment of the present invention will be described in detail by referring to the accompanying drawings.

Figure 1:
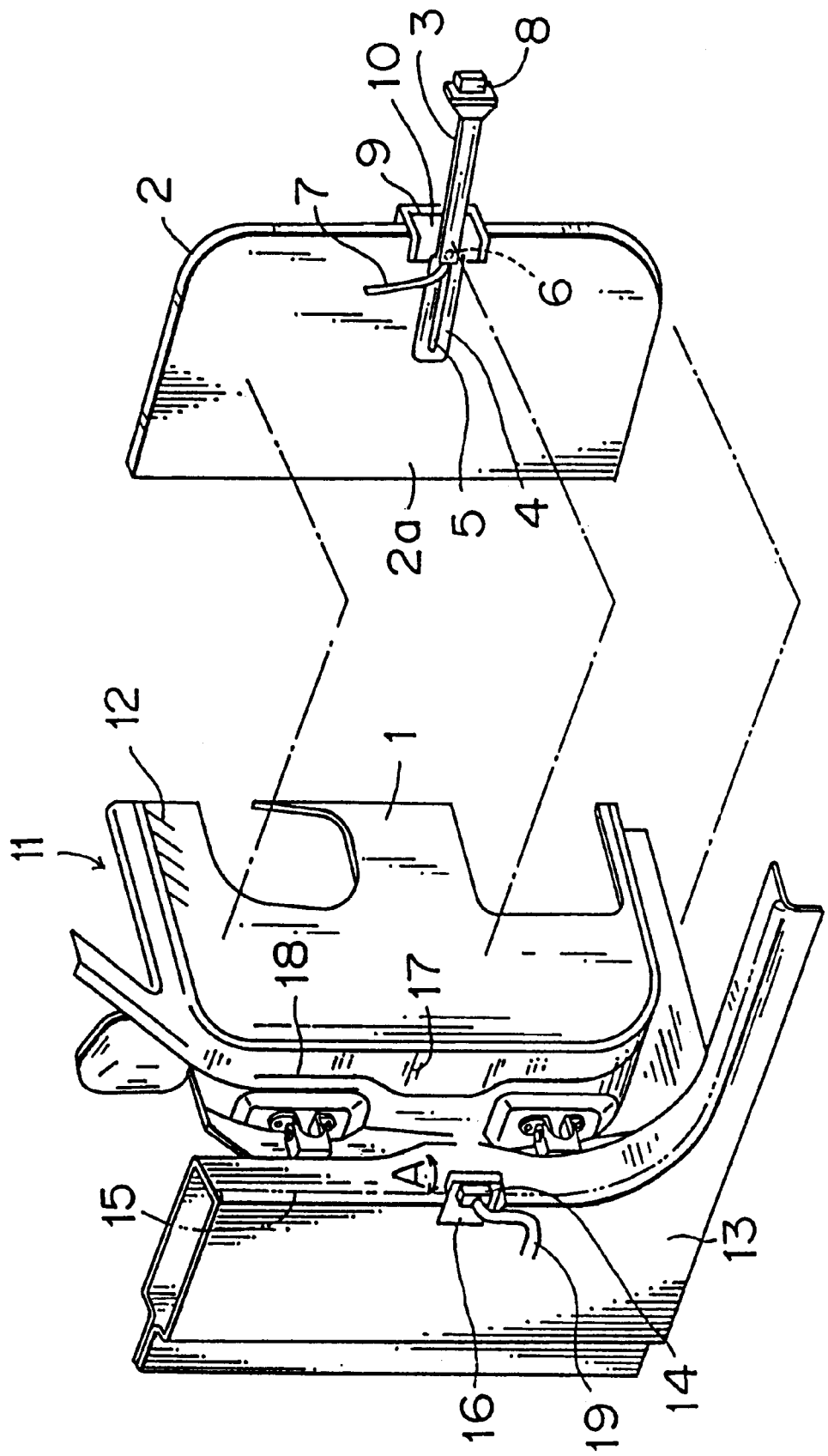
FIG. 1 is an exploded, perspective view of an assembly structure of an automotive door harness as one embodiment of this invention.

FIG. 1 shows an example of an automotive door harness assembly structure of this invention.

This structure has a slide guide 4 for a rigid harness protector 3 horizontally mounted on a door trim 2 joined to a door inner panel 1 of the car door 11 so that the harness protector 3 is slidable on the slide guide 4.

The door trim 2 has an arm rest and associated devices on its surface opposite the slide guide mounting surface 2a. It is noted that a structure having a slide guide 4 on the door inner panel 1 has already been proposed in a separate application.

The slide guide 4 is secured to the surface 2a of the door trim 2 that is joined to the door inner panel 1 and is disposed horizontal almost at the center of the door trim 2 with respect to the direction of height or slightly lower. In this example, the slide guide 4 has a longitudinally extending guide slot 5, which receives a projection 6 provided at the rear end of the harness protector 3 so that the protector 3 can move horizontally along the slide guide 4.

A wiring harness 7 is inserted through the protector 3 and a connector 8 at the front end of the wiring harness is secured to the front end portion of the protector 3. The wiring harness 7 is led out from the rear end opening of the protector 3.

At the front end portion of the door trim 2, a protector receiving portion 9 is formed close to the front end of the slide guide 4. The protector receiving portion 9 protrudes to the outside of the door trim 2 (toward the passenger compartment side) and has a space 10 to absorb oscillations of the protector 3. When the door is open, the protector 3 projects from the protector receiving portion 9 as shown in FIG. 1 and, when the door is closed, retracts into the protector receiving portion 9 between the door trim 2 and the door inner panel 1. The surface of the door inner panel 1 is lined with a water-proof sheet 12 that protects the wiring harness 7 and the protector 3.

A connector 14 on the car body 13 side, which is to be coupled to the connector 8 of the wiring harness 7 (door harness) 7 on the door side, is arranged on the passenger compartment side of a weather strip 15 on the car body 13 and is pivotally supported by a bracket 16 as shown by an arrow A. Another weather strip 18 is provided near the center of a front end face 17 of the door 11 on the hinge mounting side. The connectors 8, 14 are protected against water by the weather strips 15, 18. The mating connector 14 is connected with a wiring harness 19 on the car body 13 side.

Figure 2:
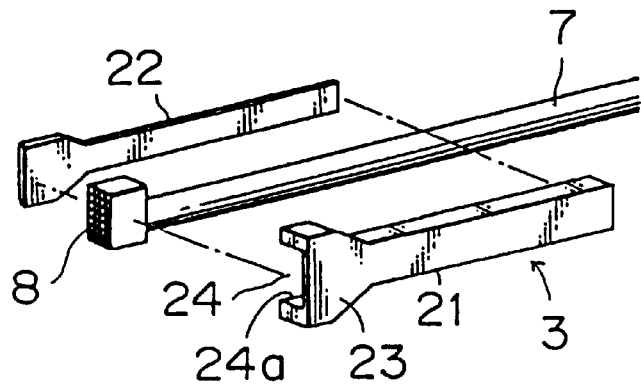
FIG. 2 is an exploded perspective view of a harness protector.

FIG. 2 shows the structure of the protector 3.

The protector 3 can be separated into two parts, a protector body 21 and a cover 22. The protector body 21 is roughly U-shaped in cross section and has at the front end portion a wide connector engagement portion 23 that engages the rear end portion of the connector 8. The protector body 21 can accommodate the wiring harness 7 in its longitudinal groove 24. The cover 22 is formed like a plate and fits in an opening 24a of the groove 24 of the protector body 21. The wiring harness 7 is held straight by a rigid protector 3 that prevents the wiring harness from being bent.

According to the structure of FIG. 1 and 2, because the door harness 7 is laid on the inner side of the sealing portion (weather strip 15) on the car body 13, a water-proofing structure is assured requiring no grommets that were used in the conventional structure, which in turn reduces the parts cost. Further, because this structure does not require passing the door harness 7 through the door panel and car body, the number of steps in harness installation work can be reduced. Blind plugs, which are used in less expensive cars, are not needed because no piercing holes are formed.

Figure 3:
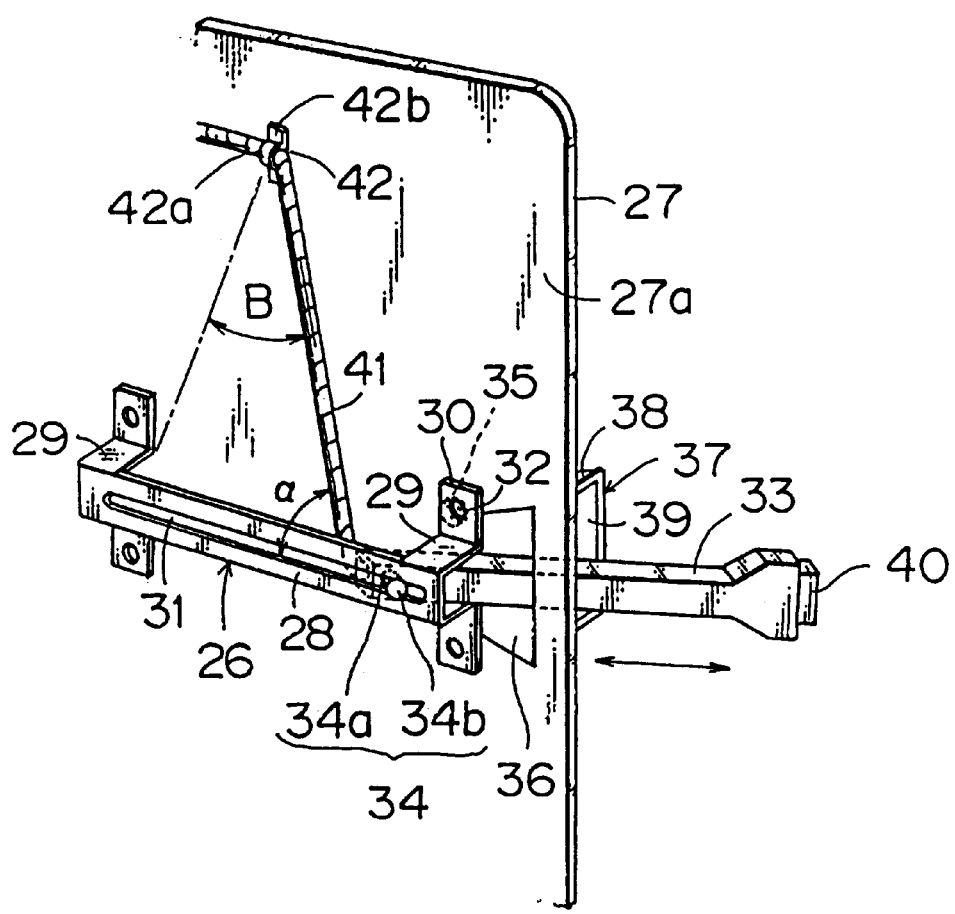
FIG. 3 is a perspective view showing a detail of a slide structure of the protector.

FIG. 3 shows the detail of another embodiment of the sliding structure of the protector on the door trim.

The slide guide 26 consists of a horizontally extending, vertically disposed base plate portion 28 facing the door trim 27, two pairs of leg portions 29 extending perpendicularly from the front and rear ends of the base plate portion 28 toward the door trim 27, and fixing plate portions 30 formed by bending the front end of the leg portions 29. The base plate portion 28 is formed with a longitudinally extending guide slot 31. The fixing plate portions 30 are formed with bolt holes 32.

A mushroom-shaped projection 34 provided at the rear end portion of the protector 33 has its shank portion 34a passed through the guide slot 31 and its head portion 34b slidably engaged with the base plate portion 28. The fixing plate portions 30 are secured to a back surface 27a of the door trim 27 as by bolts 35. An cut hole 36 is formed extending from the front legs 29 toward the front end portion of the door trim 27. On the front side of the door trim 27 a protector receiving portion 37 protrudes at the location of the opening 36. The protector receiving portion 37 has a tapered wall 38 gradually diverging as it nears the front end portion of the door trim and an opening 39 communicating with the cut hole 36.

When the door is open, the projection 34 is situated close to the front end of the guide slot 31, causing the protector 33 to advance between the front paired legs 29 and through the cut hole 36 and to protrude forwardly through the opening 39 of the protector receiving portion 37. When the door is closed, the projection 34 is situated near the rear end of the guide slot 31, causing the protector 33 except for the portion near the connector 40 to retract to the back surface 27a side of the door trim 27 and to rest between the slide guide 26 and the door trim 27. With the door closed, the protector 33 inclines with respect to the surface of the door trim 27 at a greater angle than when the door is open, and the front half of the protector 33 is situated inside the protector receiving portion 37. The connector 40 is engaged with the mating connector on the car body side (14 of FIG. 1) at all times.

In FIG. 3, the wiring harness 41 led out from the rear end of the protector 33 extends inclined rearwardly and upwardly toward the top of the door trim 27, where it is oscillatably supported by a clip 42. The clip 42 consists of a curved portion 42a that supports the wiring harness 41 so that the wiring harness 41 can move therethrough, and a fixing portion 42b that is secured to the door trim 27 as by bolt.

In this embodiment, the horizontal distance L between the projection 34 and the clip 42 when the door is open is about 10 mm. As the protector 33 slides along the slide guide 26 when the door is opened or closed, the wiring harness 41 oscillates about the clip 42 as indicated by an arrow B. In this example, the wiring harness 41 rises at an angle of about 45 degrees when the door is opened and closed.

The clip 42 prevents the slackening of the wiring harness 41 when the door is opened or closed and keeps the length of the wiring harness 41 constant, assuring smooth sliding motion of the protector 33. The clip 42 may be installed at the lower part, rather than at the upper part, of the door trim 27 so that the wiring harness 41 runs below the slide guide 26.

In the structure of FIG. 3, because the rear end portion of the protector 33 slides along the slide guide 26, the wiring harness 41 is prevented from contacting the door inner panel with a strong force. Further, because the harness passage within the door can be restricted in the same predetermined location, it is possible to eliminate its interference with other devices in the door. In FIG. 3, the protector 33 may be provided with a mechanism of the slide guide 26 and the projection 34 to engage the slide guide 26 may be secured to the door trim 27.

Figure 4:
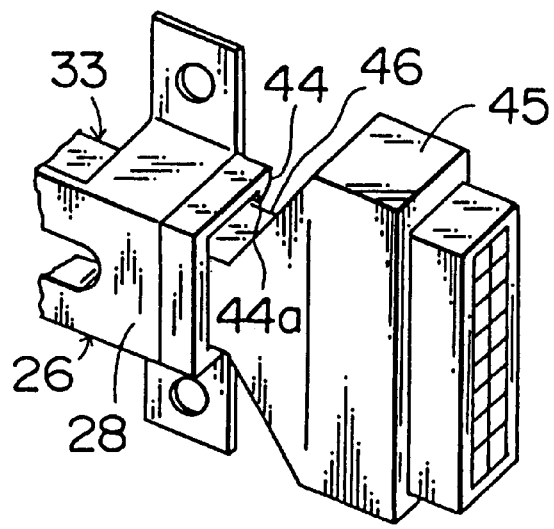
FIG. 4 is a perspective view of a temporary holding mechanism for the protector.

FIG. 4 shows a structure which has a temporary locking claw 44 or a temporary locking projection at the front end of the slide guide 26 to hold the protector 33 temporarily in the slide guide 26 when the door is in a subassembly state (i.e., the door is not yet assembled onto the car body).

The temporary locking claw 44 engages the circumferential wall of the protector 33 (wall surface 46 facing the door trim) slightly behind a connector engagement portion 45 of the protector 33 to temporarily hold the protector 33 in the slide guide 26. The circumferential wall of the protector 33 is in intimate contact with an engagement surface 44a of the temporary locking claw 44 and with the back surface of the base plate portion 28 of the slide guide 26.

This prevents the protector 33 and the wiring harness 41 from being dislocated or protruding outside even when the door subassembly is tilted, allowing the door subassembly to be mounted onto the car body side easily. Further, because the protector 33 is held retracted into the slide guide 26 and the wiring harness 41 is held tense at the rear end of the slide guide 26 without any slackness as shown in FIG. 3, the door trim 27 can be assembled to the door inner panel (1 of FIG. 1) easily. When the door subassembly is mounted on the car body (13 of FIG. 1) and the connector 40 is coupled to the mating connector (14 of FIG. 1), the protector 33 is disengaged from the temporary locking claw 44.

Figure 5:
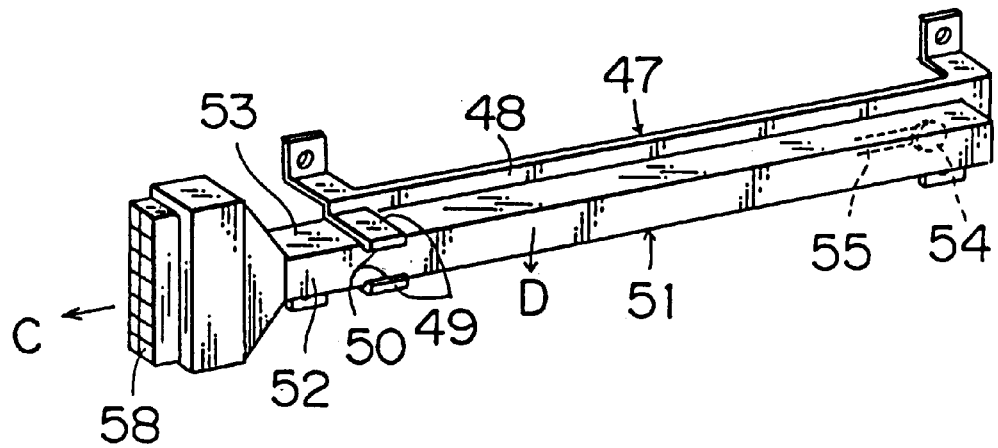
FIG. 5 is a perspective view of another temporary holding mechanism.

FIG. 5 shows another temporary holding structure for the protector.

This structure has a pair of resilient temporary locking plates 49, 49 erected at the front end portion of the front surface of the base plate portion 48 of the slide guide 47 similar in shape to the previous embodiment to temporarily hold a protector 51 between the paired temporary locking plates 49, 49.

The temporary locking plates 49 have inwardly protruding engagement claws 50 at the front ends thereof, which engage a wall surface 52 of the protector 51, holding the protector 51 against the base plate portion 48. At the same time, the paired temporary locking plates 49, 49 hold side surfaces 53 of the protector 51 in an intimate contact state or with a small gap therebetween. This prevents the protector 51 from protruding out in the longitudinally forward direction (in the direction indicated by an arrow C) and sideways (in the direction indicated by an arrow D) when the door is in the subassembly state. As in the previous embodiment, the protector 51 has a mushroom-like projection 54, which is engaged in a guide slot 55 formed in the the slide guide 47

The structure of FIG. 5 is applied not to the door trim but to a door inner panel 56 that is provided with the slide guide 47.

Figure 6:
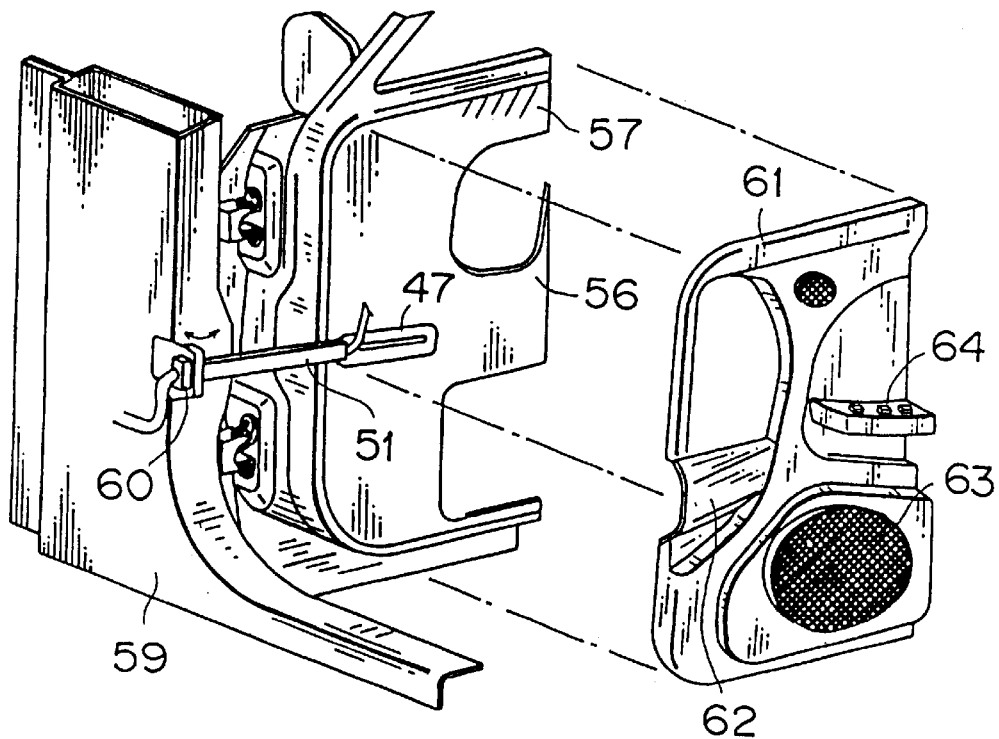
FIG. 6 is a perspective view of the door harness assembly structure when the protector is installed on the door inner panel side.
Figure 7:
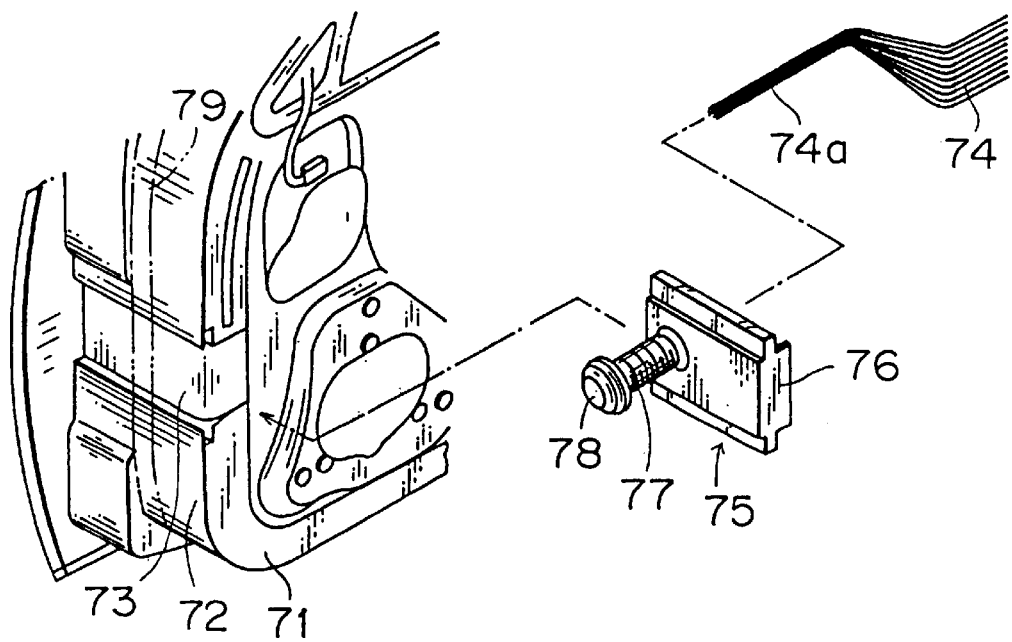
FIG. 7 is an exploded, perspective view of a conventional door harness assembly structure.
Figure 8:
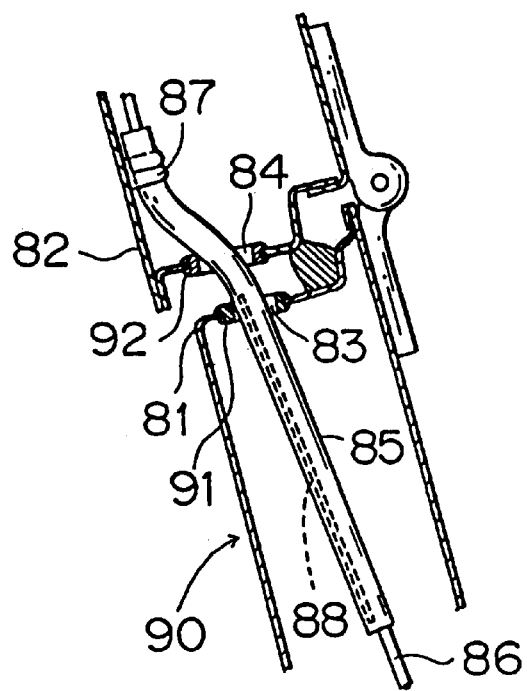
FIG. 8 is a plan view of another example of conventional door harness assembly structure when the door is closed.
Figure 9:
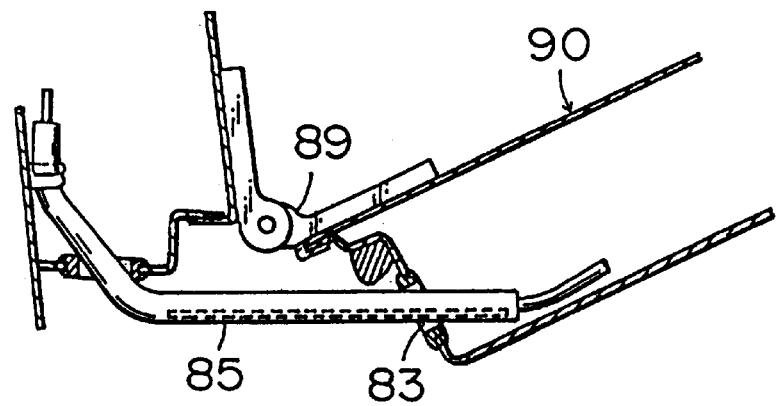
FIG. 9 is a plan view of the conventional door harness assembly structure of FIG. 8 when the door is open.

The structure of FIG. 6 has already been proposed, in which the door inner panel 56 is provided on its surface with a water-proof sheet 57, to which is secured horizontally the slide guide 47 that slidably holds the rear end portion of the protector 51, with the other end portion of the protector 51 connected through a connector 58 to a rotatable mating connector 60 on the car body 59 side. A door trim 61 is formed with a bulged protector accommodating portion 62 and also provided with a speaker 63 and switches 64. In the assembly condition of FIG. 6, the protector 51 is cleared from the engagement claws 50 (FIG. 5).

As described above, this invention has the following advantages. Because the wiring harness and protector are provided on the door trim side, the assembly of the wiring harness is completed only by mounting the door trim subassembly, improving the work efficiency. Further because the wiring harness and protector assembled onto the door trim are protected by the waterproof sheet and weather strip, there is no need for waterproofing measures, leading to a reduction in cost. Furthermore, because the protector is prevented from protruding outside when the door is in the subassembly state, the door can be mounted onto the car body with improved work efficiency.

Having now fully described the invention, it will be apparent to one of ordinary skill in the art that many changes and modifications can be made thereto without departing from the spirit and scope of the invention as set forth herein.

What is claimed is:

1. An assembly structure of an automotive door harness comprising:

a car door including a door inner panel and a door trim which covers said door inner panel;

a protector installed between said door inner panel and said door trim; and a wiring harness inserted through said protector and having a connector attached at one end of said protector;

wherein said protector is slidably held on said door trim.

2. An assembly structure of an automotive door harness according to claim 1, wherein a slide guide is provided on said door trim to slidably hold the other end of said protector.

3. An assembly structure of an automotive door harness according to claim 2, further comprising a protector receiver provided adjacent to a car body-side end of said slide guide for receiving said protector therein when said protector is retracted on closing said door.

4. An assembly structure of an automotive door harness according to claim 3, wherein said protector receiver is provided at a first side of said door trim where said slide guide is provided.

5. An assembly structure of an automotive door harness according to claim 3, wherein said protector receiver is provided at a second side of said door trim opposite said first side, wherein said slide guide comprises a plate portion formed with a longitudinally extending guide slot and leg portions extending perpendicularly from said plate portion and secured to said door trim, and wherein said protector is situated between said plate portion and said door trim, projects to said second side through a cut hole in said door trim, and is retracted into said protector receiver on closing said door.

6. An assembly structure of an automotive door harness according to claim 5, wherein said leg portions comprise two pairs of leg portions provided at longitudinally opposite ends of said plate portion.

7. An assembly structure of an automotive door harness according to claim 5, wherein a projection is provided at said the other end of the protector which slidably engages in said guide slot of the plate portion.

8. An assembly structure of an automotive door harness according to claim 5, wherein said protector receiver has a tapered wall gradually diverging as it nears a car body-side end of said door trim.

9. An assembly structure of an automotive door harness comprising:

a car door including a door inner panel and a door trim which covers said door inner panel;

a protector installed between said door inner panel and said door trim;

a wiring harness inserted through said protector and having a connector attached at one end of said protector; and a slide guide provided on said door inner panel or on said door trim, which slidably holds the other end of said protector, wherein said slide guide is provided with a temporary locking means to temporarily lock said protector such that said protector will not be dislocated or protrude outside when said door is in a subassembly state.

* * * * *